(12) United States Patent
Hammond

(10) Patent No.: US 8,632,254 B2
(45) Date of Patent: Jan. 21, 2014

(54) BEARING SUMP WITH BI-DIRECTIONAL STIFFNESS

(75) Inventor: Hunter Hammond, Phoenix, AZ (US)

(73) Assignee: Honeywell International Inc., Morristown, NJ (US)

(*) Notice: Subject to any disclaimer, the term of this patent is extended or adjusted under 35 U.S.C. 154(b) by 18 days.

(21) Appl. No.: 13/460,692

(22) Filed: Apr. 30, 2012

(65) Prior Publication Data
US 2013/0287327 A1 Oct. 31, 2013

(51) Int. Cl.
*F16C 27/04* (2006.01)
*F16C 35/04* (2006.01)
*F16C 35/067* (2006.01)

(52) U.S. Cl.
CPC .................. *F16C 35/067* (2013.01)
USPC ............ 384/535; 384/99; 384/428; 384/441; 384/546

(58) Field of Classification Search
USPC ........... 384/535, 546, 549, 99, 441, 428; 418/55.1, 55.6; 74/7 E, 574; 417/360, 417/535
See application file for complete search history.

(56) References Cited

U.S. PATENT DOCUMENTS

| | | | | |
|---|---|---|---|---|
| 3,369,087 A | * | 2/1968 | Fritz | 318/469 |
| 3,501,245 A | * | 3/1970 | Ivanko | 415/113 |
| 4,509,804 A | | 4/1985 | Klusman | |
| 5,821,654 A | * | 10/1998 | Woo | 310/90 |
| 6,287,014 B1 | * | 9/2001 | Salla | 384/546 |
| 6,439,772 B1 | | 8/2002 | Ommundson et al. | |
| 6,490,940 B1 | * | 12/2002 | Izquierdo et al. | 74/7 E |
| 7,731,426 B2 | | 6/2010 | Meacham et al. | |
| 8,118,570 B2 | | 2/2012 | Meacham et al. | |
| 2004/0057837 A1 | * | 3/2004 | Skinner | 417/360 |
| 2004/0057848 A1 | * | 3/2004 | Haller et al. | 417/410.5 |
| 2004/0057849 A1 | * | 3/2004 | Skinner et al. | 417/410.5 |
| 2004/0057859 A1 | * | 3/2004 | Haller | 418/55.6 |
| 2006/0204153 A1 | | 9/2006 | Alam et al. | |
| 2007/0096572 A1 | * | 5/2007 | Watkins et al. | 384/535 |
| 2008/0152528 A1 | * | 6/2008 | Ishikawa et al. | 418/55.4 |

OTHER PUBLICATIONS

Chen, C. L., Yau, H. T., "Chaos in the Imbalance Response of a Flexible Rotor Supported by Oil Film Bearings with Non-Linear Suspension", Nonlinear Dynamics, vol. 16, No. 1, pp. 71-90, Kluwer Academic Publishers, 1998, Netherlands [retrieved on Mar. 30, 2012]. Retrieved from Internet: <URL: http://www.springerlink.com/content/h45273j063442p23>.

Dostal, M., Roberts, J. B., Holmes R., "Stability Control of Flexible Shafts Supported on Oil-Film Bearings", Journal of Sound and Vibration, 35(3), pp. 361-377, 1974, England. Received Nov. 21, 1973, and in revised form Feb. 14, 1974.

* cited by examiner

*Primary Examiner* — Marcus Charles
(74) *Attorney, Agent, or Firm* — Ingrassia Fisher & Lorenz, P.C.

(57) ABSTRACT

A bearing sump includes an annular housing having a first axial length that is substantially equivalent to an axial length of the bearing sump; an annular bearing support disposed concentrically within the annular housing and having a second axial length that is less than about 50% of the first axial length; an annular space between the housing and the bearing support; and first and second axial ribs in the form of annular segments having a central angle of less than about 60 degrees and connecting with both the housing and the bearing support.

18 Claims, 6 Drawing Sheets

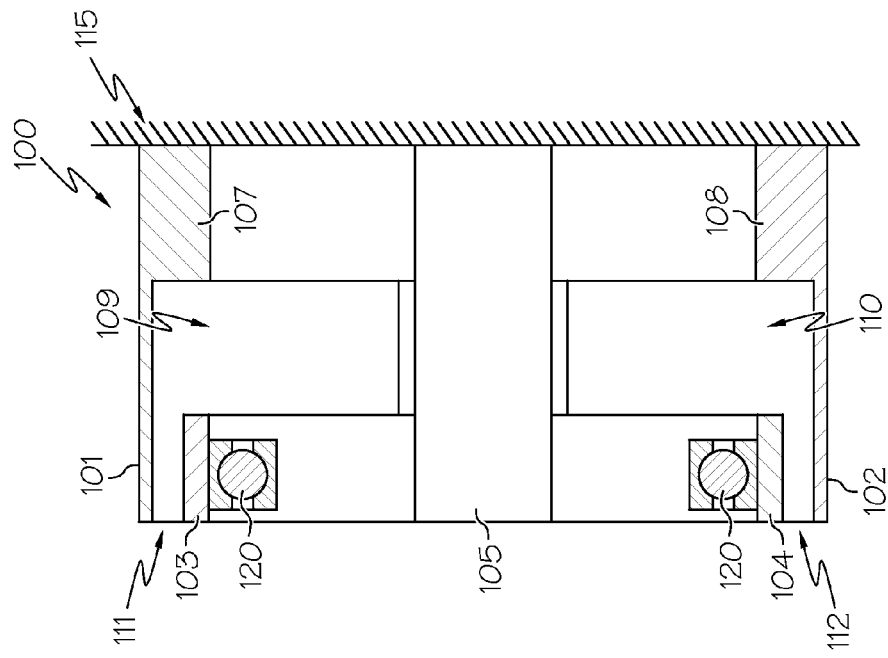
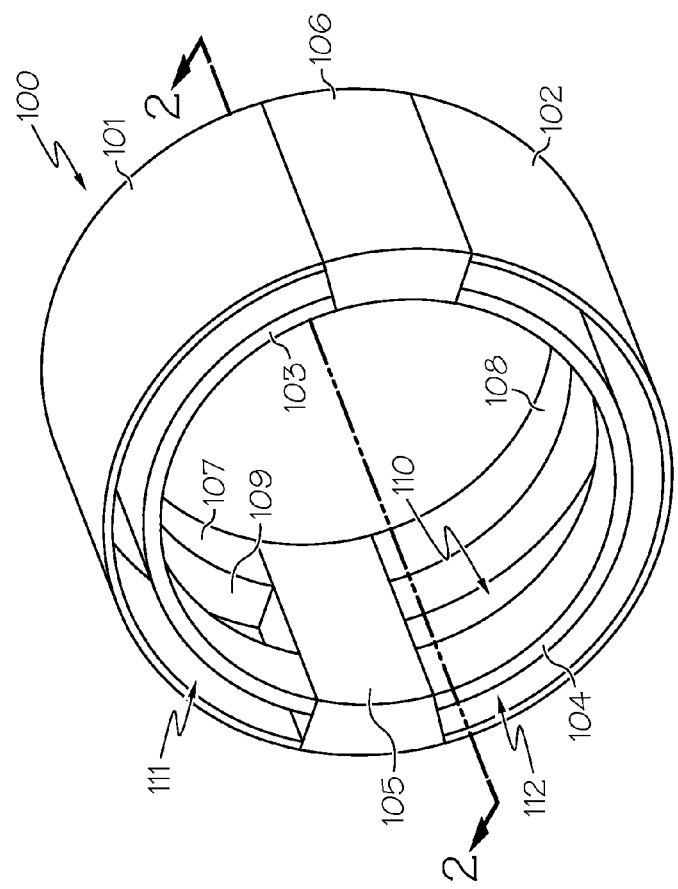

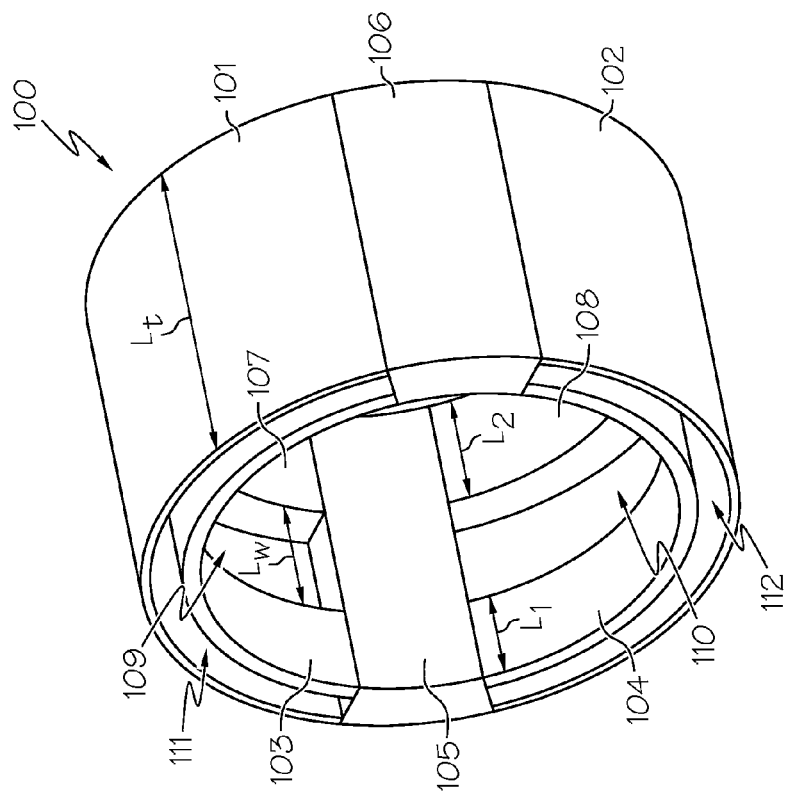
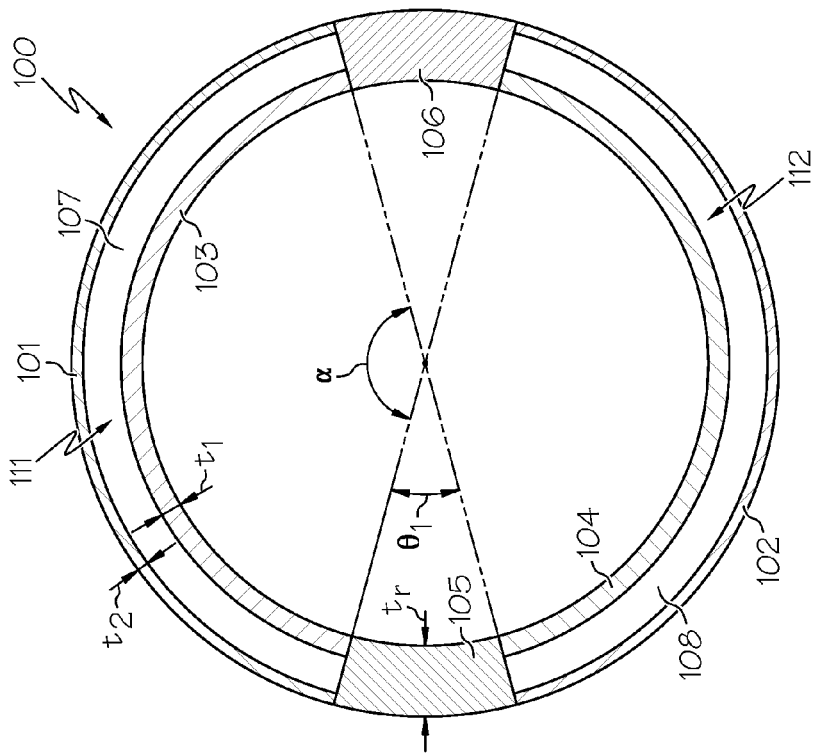
FIG. 4
FIG. 3

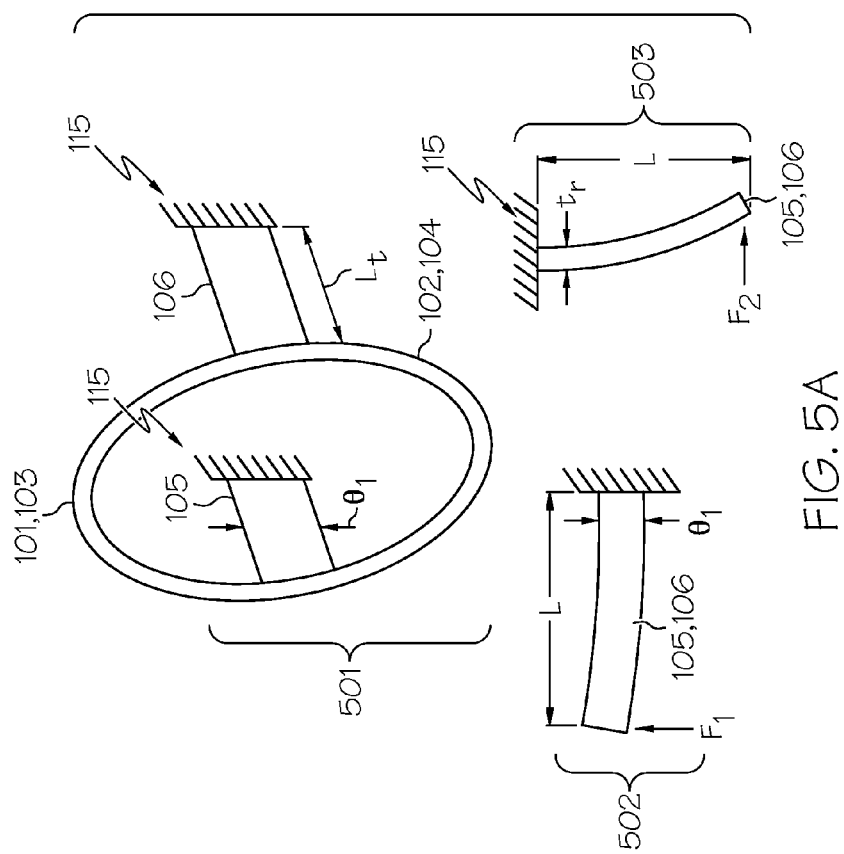
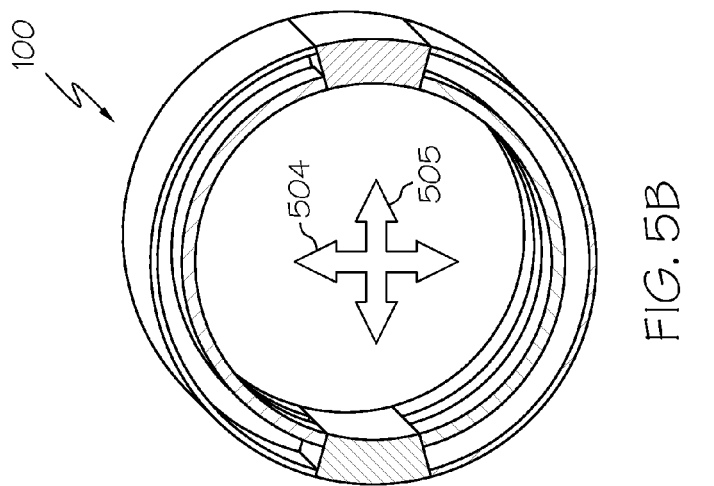
FIG. 5A
FIG. 5B

BEARING SUMP WITH BI-DIRECTIONAL STIFFNESS

STATEMENT REGARDING FEDERALLY SPONSORED RESEARCH OR DEVELOPMENT

This invention was made with Government support under W56 HZV-06-C-0173 awarded by the United States Army. The Government has certain rights in the invention.

TECHNICAL FIELD

The present disclosure generally relates to turbo machinery and, more specifically, to a bearing sump that interfaces between bearing elements and a static support structure for turbo machinery.

BACKGROUND

Vibration is a well-known problem associated with rotating machinery, such as turbo machinery. Synchronous vibration (SV) is caused by a rotating mass imbalance, and frequently occurs when the mass center of the rotor is not coincident with its geometric center. Another form of vibration is non-synchronous vibration (NSV), which occurs when a radial deflection of the rotor results in tangential force normal to the deflection. The magnitude of the tangential force increases with the deflection, and the system will become unstable if there is insufficient damping, resulting in undesirable vibration. Damping the vibration in a turbo machine provides quiet, comfortable, and efficient operation of the machine, reduces fatigue stresses on the machine and its supports, and safeguards against damage that can be caused by unstable vibration.

The most common approach to reducing the impact of vibration on rotating machinery components, particularly with regard to NSV, is to provide a squeeze film damper (SFD). Typically, a bearing rotatably supports a shaft in the machinery, such as a rotor shaft in the example of a jet engine. The bearing is, in turn, supported by a SFD. The SFD damps vibrations from the rotor by providing a constant flow of oil to an annular chamber surrounding the bearing. The oil film can be squeezed through one or more exit channels when the bearing moves from its central position as a result of rotor shaft eccentricity. SFDs are not ideal because they offer sub-optimal damping characteristics while still requiring oil and maintenance. Additionally, due to the oil required, SFDs are limited to regions of the rotating machinery that operate below a threshold temperature.

It would thus be desirable to provide an effective means for NSV damping that is not temperature limited. Other desirable features and characteristics of embodiments of the present invention will become apparent from the subsequent Detailed Description and the appended Claims, taken in conjunction with the accompanying drawings and the foregoing Background.

BRIEF SUMMARY

Exemplary embodiments of a bearing sump are disclosed herein. In one embodiment, a bearing sump includes an annular housing having a first axial length that is substantially equivalent to an axial length of the bearing sump; an annular bearing support disposed concentrically within the annular housing and having a second axial length that is less than about 50% of the first axial length; an annular space between the housing and the bearing support; and first and second axial ribs in the form of annular segments having a central angle of less than about 60 degrees and connecting with both the housing and the bearing support.

In another embodiment, an apparatus, such as for example a bearing sump, configured for damping non-synchronous vibration includes a first cylinder and second, concentric cylinder disposed within the first cylinder; a space formed between the first and second concentric cylinders; and first and second longitudinal ribs connecting within the first and second concentric cylinders. The second cylinder is configured to receive an annular bearing for providing vibration damping thereto, and the first cylinder, the second cylinder, and the first and second longitudinal ribs form an integral structure.

In yet another embodiment, a bearing sump for damping non-synchronous vibration includes an annular housing having a first axial length that is substantially equivalent to an axial length of the bearing sump; an annular bearing support disposed concentrically within the annular housing and having a second axial length that is less than about 50% of the first axial length; an annular space between the housing and the bearing support; first and second axial ribs in the form of annular segments having a central angle of less than about 60 degrees and connecting with both the housing and the bearing support; and an end ring disposed concentrically and abuttingly within the housing and having a third axial length that is less than about 50% of the first axial length. The end ring is disposed along a first axial end of the bearing support that is adjacent to a constrained aft plane and wherein the bearing support is disposed along a second axial end of the bearing support opposite the first axial end. The sum of the second and third axial lengths is less than the first axial length, and wherein a void is disposed between the end ring and the bearing support. The bearing support is configured to receive an annular bearing for providing vibration damping thereto. The housing, the bearing support, and the first and second axial ribs form an integral structure. Further, the bearing support has a radial thickness that is greater than or equal to a radial thickness of the housing.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

At least one example of the present invention will hereinafter be described in conjunction with the following drawing figures, wherein like numerals denote like elements, and wherein:

FIG. 1 is a simplified perspective illustration of an exemplary bearing sump in accordance with one embodiment;

FIG. 2 is a cross-sectional view of the bearing sump illustrated in FIG. 1, taken along line 2-2;

FIG. 3 is an end view of the bearing sump illustrated in FIG. 1;

FIG. 4 is an additional perspective illustration of the bearing sump shown in FIG. 1, rotated about a radial axis;

FIGS. 5A and 5B are functional illustrations of a bearing sump in accordance with one embodiment, showing certain configurable parameters thereof;

DETAILED DESCRIPTION

Figure 6:
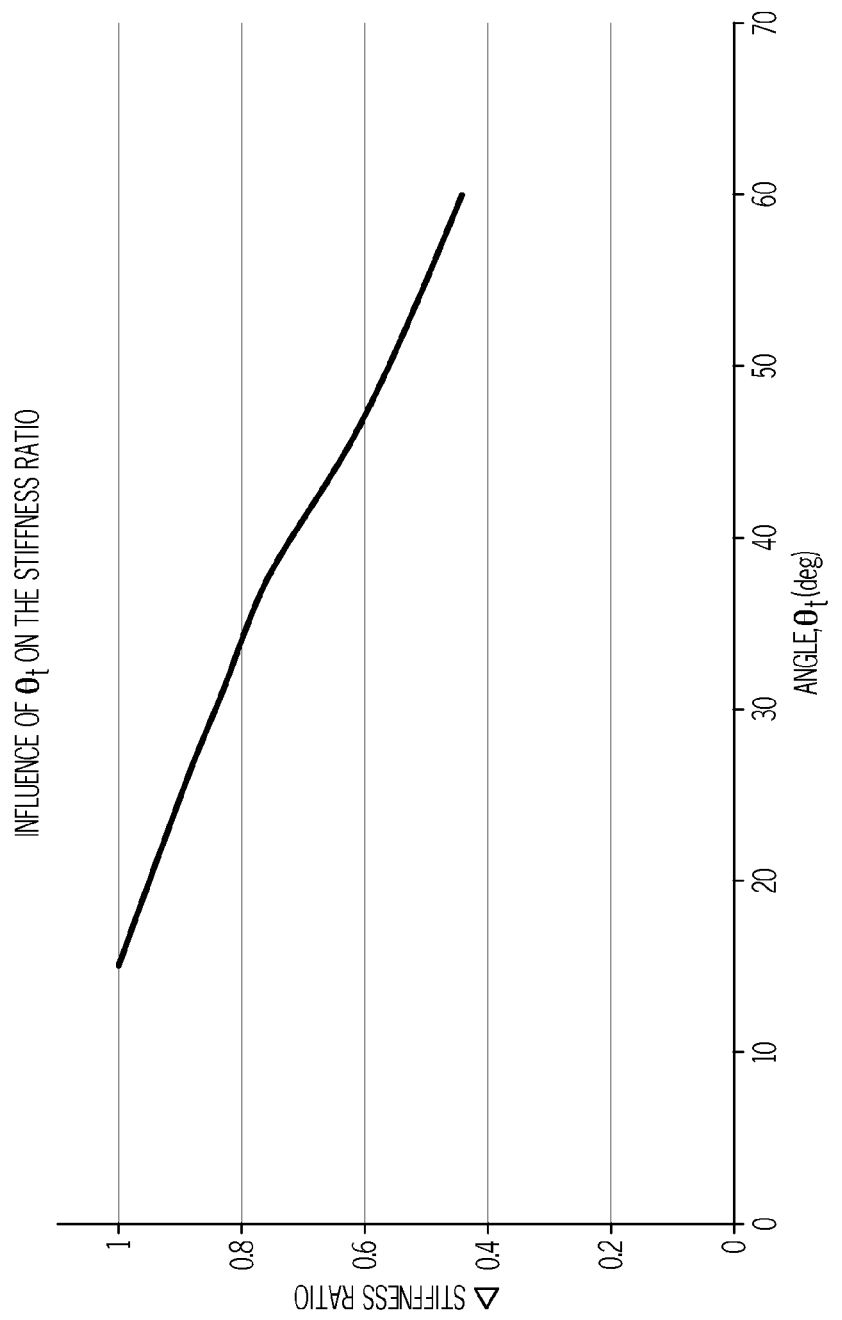
FIGS. 6-8 are graphs illustrating the relationship between certain configurable parameters of a bearing sump in accordance with one embodiment.

The following Detailed Description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. As used herein the terms "substantially the same" or "substantially equivalent" mean having a variance of no greater than about 5%. As used herein, the term "about" means the stated amount or range and any legal equivalents thereto. Furthermore, there is no intention to be bound by any expressed or implied theory presented in the preceding Technical Field, Background, Brief Summary, or the following Detailed Description.

Embodiments of a bearing sump are disclosed herein. With reference to FIGS. 1-4, an exemplary bearing sump 100 includes a first housing portion 101 and a second housing portion 102. First and second housing portions 101, 102 are generally in the shape of an annular segment defined by a central angle $\theta_2$ of less than about 180 degrees. For example, both housing portions 101, 102 can be an annular segment having a central angle $\theta_2$ of less than about 180 degrees, such as less than about 170 degrees. In an embodiment, the axial length of the housing portions 101, 102 is substantially commensurate with the total axial length of the bearing sump 100, $L_t$. $L_t$ can range, for example, from about 1 in. to about 6 in., depending on the design and size of the turbo machinery in which bearing sump 100 is employed, and on the particular bearing therein for which bearing sump 100 is employed. In an embodiment, the radial thickness of the housing portions 101, 102 is defined by $t_2$, which, can range, for example, from about 0.040 in. to about 0.200 in., depending on the desired NSV damping and design characteristics for the particular bearing for which bearing sump 100 is employed, as will be discussed in greater detail below. In an embodiment, both housing portions 101, 102 are substantially the same size and shape.

First and second housing portions 101, 102 are connected together by a first axial rib 105 and second axial rib 106. First and second axial ribs 105, 106 are generally in the shape of an annular segment defined by a central angle $\theta_1$ of less than about 60 degrees, such as less than about 45 degrees, or even less than about 30 degrees. For example, both axial ribs 105, 106 can be an annular segment having a central angle $\theta_1$ of between about 5 degrees and about 60 degrees, such as between about 10 degrees and about 45 degrees. In an embodiment, the first and second axial ribs 105, 106 are positioned substantially diametrically opposite one another in the bearing sump 100. In an embodiment, the axial length of the axial ribs 105, 106 is substantially commensurate with the total axial length of the bearing sump 100, $L_t$. In an embodiment, the radial thickness of the axial ribs 105, 106 is defined by $t_r$, which, can range, for example, from about 0.100 in. to about 1 in., depending on the design and size of the turbo machinery in which bearing sump 100 is employed, and on the particular bearing therein for which bearing sump 100 is employed. In an embodiment, both axial ribs 105, 106 are substantially the same size and shape.

In an embodiment, axial ribs 105 and 106 are disposed at opposite ends of the first and second housing portions 101, 102, and as such, when connected as illustrated in FIGS. 1-4, first and second housing portions 101, 102 and first and second axial ribs 105, 106 generally form a continuous annulus. For simplicity of description, the annulus that is formed by the first and second housing portions 101, 102 and the first and second axial ribs 105, 106 will be referred to as housing 101,102. In an embodiment wherein the bearing sump 100 is perfectly cylindrical (annular), therefore, the sum of the central angles of the first and second housing portions 101, 102 and of the first and second axial ribs 105, 106 will be 360 degrees. In an embodiment, the first and second housing portions 101, 102 and the first and second axial ribs 105, 106 have an equivalent axial length, thereby forming a cylindrical (annular) bearing sump 100 having a consistent axial length, $L_t$.

In an embodiment, disposed concentrically inward from the first and second housing portions 101, 102 may be provided first and second bearing support portions 103, 104. Bearing support portions 103, 104 are generally in the shape of an annular segment defined by a central angle of less than about 180 degrees. For example, both bearing support portions 103, 104 can be an annular segment having a central angle of less than about 180 degrees, such as less than about 170 degrees. In an embodiment, the axial length $L_1$ of the bearing support portions 103, 104 is substantially less total axial length of the bearing sump 100, $L_t$. $L_1$ can range, for example, from about 5% to about 50% of $L_t$, such as about 10% to about 35% of $L_t$, depending on the desired NSV damping characteristics for the particular bearing for which bearing sump 100 is employed, as will be discussed in greater detail below. Bearing support portions 103, 104 are disposed at an axial end of the bearing sump 100 that is opposite a constrained aft plane 115 against which the bearing sump 100 is disposed In an embodiment, the radial thickness of the bearing support portions 103, 104 is defined by $t_1$, which, can range, for example, from about 0.060 in. to about 0.300 in., depending on the desired NSV damping characteristics for the particular bearing for which bearing sump 100 is employed, as will be discussed in greater detail below. In an embodiment, both housing portions 101, 102 are substantially the same size and shape.

In an embodiment, axial ribs 105 and 106 are disposed at opposite ends of the first and second bearing support portions 103, 104, and as such, when connected as illustrated in FIGS. 1-4, first and second bearing support portions 103, 104 and first and second axial ribs 105, 106 generally form a continuous annulus. As such, it will be appreciated that the first and second bearing support portions 103, 104 and the first and second housing portions 101, 102 have the same central angle $\theta_2$. In an embodiment wherein the bearing sump 100 is perfectly cylindrical (annular), therefore, the sum of the central angles of the first and second bearing support portions 103, 104 and of the first and second axial ribs 105, 106 will be 360 degrees. For simplicity of description, the annulus that is formed by the first and second bearing support portions 103, 104 and the first and second axial ribs 105, 106 will be referred to as bearing support 101,102. Bearing support 101, 102 is configured to support an annular bearing 120 therewithin, as illustrated particularly in FIG. 2.

In an embodiment, the sum of the radial thicknesses $t_2$ of the first housing portion 101 and the first bearing support portion 103 or of the second housing portion 102 and the second bearing support portion 104 (i.e., $t_2+t_1$) is less than the radial thickness $t_r$ of either axial ribs 105 or 106 (i.e., $t_r>t_2+t_1$). As such, the first and second housing portions 101, 102 and the first and second bearing support portions 103, 104 can be connected to the axial ribs 105, 106 in such a manner as to leave a first space 111 between the first housing portion 101 and the first bearing support portion 103 and a second space 112 between the second housing portion 102 and the second bearing support portion 104. That is, first and second housing portions 101, 102 can be connected to axial ribs 105, 106 at a radially outward end thereof, whereas first and second bearing support portions 103, 104 can be connected to axial ribs 105, 106 at a radially inward end thereof. As such, the first and second spaces 111, 112 run between radially mid-portions of the axial ribs 105, 106, a radially outward surface of the first and second bearing support portions 103, 104, and a radially inward surface of the first and second housing portions 101, 102. Further, the radial thickness of the first and second spaces 111, 112 is defined by $t_r-(t_2+t_1)$. In an embodiment, both spaces 111, 112 are substantially the same size and shape.

In an embodiment, disposed concentrically inward from the first and second housing portions 101, 102 may be provided first and second end portions 107, 108. End portions 107, 108 are generally in the shape of an annular segment defined by a central angle of less than about 180 degrees. For example, both end portions 107, 108 can be an annular segment having a central angle of less than about 180 degrees, such as less than about 170 degrees. In an embodiment, the axial length $L_2$ of the end portions 107, 108 is substantially less total axial length of the bearing sump 100, $L_t$. $L_2$ can range, for example, from about 5% to about 50% of $L_t$, such as about 10% to about 35% of $L_t$, depending on the desired NSV damping characteristics for the particular bearing for which bearing sump 100 is employed, as will be discussed in greater detail below. End portions 107, 108 are disposed at the above-noted axial end of the bearing sump 100 that is disposed against the constrained aft plane 115. In an embodiment, the radial thickness of the end portions 107, 108 is defined by $t_r-t_2$. In an embodiment, both housing portions 101, 102 are substantially the same size and shape.

In an embodiment, axial ribs 105 and 106 are disposed at opposite ends of the end portions 107, 108, and as such, when connected as illustrated in FIGS. 1-4, first and second end portions 107, 108 and first and second axial ribs 105, 106 generally form a continuous annulus. As such, it will be appreciated that the first and second end portions 103, 104 and the first and second housing portions 101, 102 have the same central angle $\theta_2$. In an embodiment wherein the bearing sump 100 is perfectly cylindrical (annular), therefore, the sum of the central angles of the first and second end portions 107, 108 and of the first and second axial ribs 105, 106 will be 360 degrees. For simplicity of description, the annulus that is formed by the first and second end portions 107, 108 and the first and second axial ribs 105, 106 will be referred to as end ring 107,108. In an embodiment, when the first and second end portions 107, 108 are disposed flush (abuttingly) against the first and second housing portion 101, 102, as illustrated in FIGS. 1-4, there is no space therebetween (in contrast to the relationship between first and second bearing support portions 103, 104 and the first and second housing portions 101, 102, where, as noted above, spaces 111 and 112 are provided).

In an embodiment, the combined axial lengths of the first and second bearing support portions 103, 104 and the first and second end portions 107, 108 is less than the total length of the bearing sump 100 (i.e., $L_1+L_2<L_t$). As such, a first window region (e.g., void) 109 is formed between the first bearing support 103 and the first end portion 107, and a second window region (e.g., void) 110 is formed between the second bearing support 104 and the second end portion 108. The length of the first and second window regions 109, 100, $L_w$, is equal to the difference between the $L_t$ and the sum of $L_1+L_2$ (i.e., $L_w=L_t-(L_1+L_2)$. In an embodiment, $L_t$ can range, for example, from about 5% to about 50% of $L_t$, such as about 10% to about 35% of $L_t$, depending on the desired NSV damping characteristics for the particular bearing for which bearing sump 100 is employed, as will be discussed in greater detail below. As is best shown in FIG. 2, first and second windows 109, 110 are connected with first and spaces 111, 112, which allows for simple and efficient oil draining and collection from the bearing sump 100.

In an embodiment where the thickness of end portions 107, 108 are equal to $t_r-t_2$, the diameter of the bearing support 103,104 and the diameter of the end ring 107,108 are equivalent, thus forming a sump inner wall that has consistent inner diameter (ID) but is discontinuous along the full axial length thereof ($L_t$) due to the presence of the first and second windows 109, 110. The sump outer wall, formed completely by the housing 101, 102 has a consistent outer diameter (OD) and is continuous along the full axial length thereof, as there are no axial spaces of any kind formed within either the first or second housing portions 101, 102.

In an embodiment, some or all of the components 101 through 108 of bearing sump 100 may be made from a metal material. For example, a nickel or nickel alloy may be used. In another example, an aluminum or aluminum alloy may be used. In yet another example, a titanium of titanium alloy may be used. In a further example, an alloy of nickel, aluminum, and/or titanium may be used. Each of the components 101 through 108 may be made of a different material or of the same material. In particular, due to the configurable characteristics of the first and second axial ribs 105 and 106, it may be desirable, in some embodiments, to employ a different material or metal for the first and second axial ribs 105 and 106 as compared to the other components of the bearing sump 100.

While the bearing sump 100 has heretofore been described as a particular configuration of components 101 through 108, such description has merely been employed for purposes of simplicity in describing the various structural features of bearing sump 100. In practice, in an embodiment, bearing sump 100 can be an integral structure, that is, formed (machined) from a single (unitary) component into the shape depicted in FIGS. 1-4. Alternatively, a series of individual such components 101 through 108 can be assembled according the above description of the bearing sump 100 and permanently bonded together (for example, metallurgically bonded in an embodiment where metals are used) to form an integral structure.

Reference will now be made to the configurable parameters of the bearing sump 100 that allow the bearing sump 100 to provide effective damping for NSV. As will be appreciated, the effect of damping can be achieved with regard to a rotating mass, such as a rotor in turbo machinery, if the bearing that supports such mass has a non-uniform or asymmetric stiffness. This non-uniform or asymmetric stiffness can be achieved at the level of bearing support, for example, through appropriate tuning of the stiffness of a bearing sump supporting the bearing, such as bearing support 100.

With reference now to FIGS. 5A and 5B, the various structural stiffnesses that can be provided by the bearing sump 100 are illustrated as abstracted and simplified functional relationships between the first and second axial ribs 105, 106, and the first and second bearing support portions 103, 104 and the first and second housing portions 101, 102. More particularly, FIG. 5B illustrates the directional stiffness provided by the bearing sump 100 in a first direction 504 that is tangent to each axial rib 105, 106 at the external surface of the bearing sump 100 and in a second direction 505 that is radial with respect to each axial rib 105, 106. As such, in an embodiment, bearing sump 100 provides bi-directional stiffness. Illustration 501 of FIG. 5A shows the bearing sump 100 with no directional force being applied. Illustration 502 of FIG. 5A shows a side view of one of the axial ribs (either 105 or 106) with a force $F_1$ applied in the first direction 504 tangent to the axial rib (105 or 106), resulting in a bending of the axial rib (105 or 106) in the first direction 504. Illustration 503 of FIG. 5A shows a top view of one of the axial ribs (either 105 or 106) with a force $F_2$ being applied in the second direction 505 radial to the axial rib (105 or 106), resulting in a bending of the axial rib (105 or 106) in the second direction 505. It is noted that, in situations where $F_1$ and $F_2$ are assumed to have a substantially equal magnitude, which is typical in a rotating imbalanced load, deflection is greater in the second direction 505 than in the first direction 504. This difference in deflection is a result of a difference in stiffness.

The stiffnesses in the first and second directions 504, 505 can be tuned by varying certain parameters of the bearing sump 100. For the discussion that follows, the stiffnesses in the first and second directions 504, 505 will be referred to with regard to a relative stiffness ratio, which is defined as the stiffness in the first direction 504 divided by the stiffness in the second direction 505. As such, the stiffness ratio is non-dimensional, so the actual units of stiffness affected by the parametric tuning discussed below are irrelevant. Parametric tuning of the stiffness ratio can be effected by adjusting certain design parameters of the bearing sump 100 that include, for example, but are not limited to: the axial rib central angle $\theta_1$; the ratio of the thickness $t_1$ of the first and second bearing support portions 103, 104 to the thickness $t_2$ of the first and second housing portions 101, 103 ($t_1/t_2$, hereinafter referred to generally as the "thickness ratio")); and the length $L_w$ of the windows 109, 110 (as a percentage of $L_t$), which is affected by the lengths of both $L_1$ and $L_2$ (of the bearing support portions 103, 104 and of the end portions 107, 108, respectively). There are of course numerous other design parameters of the bearing sump 100 that can affect the stiffness ratio, and tuning thereof is considered to be within the scope of the present disclosure. The enumerated parameters are merely provided for purposes of illustration with regard to their effect on the stiffness ratio.

Figure 7:
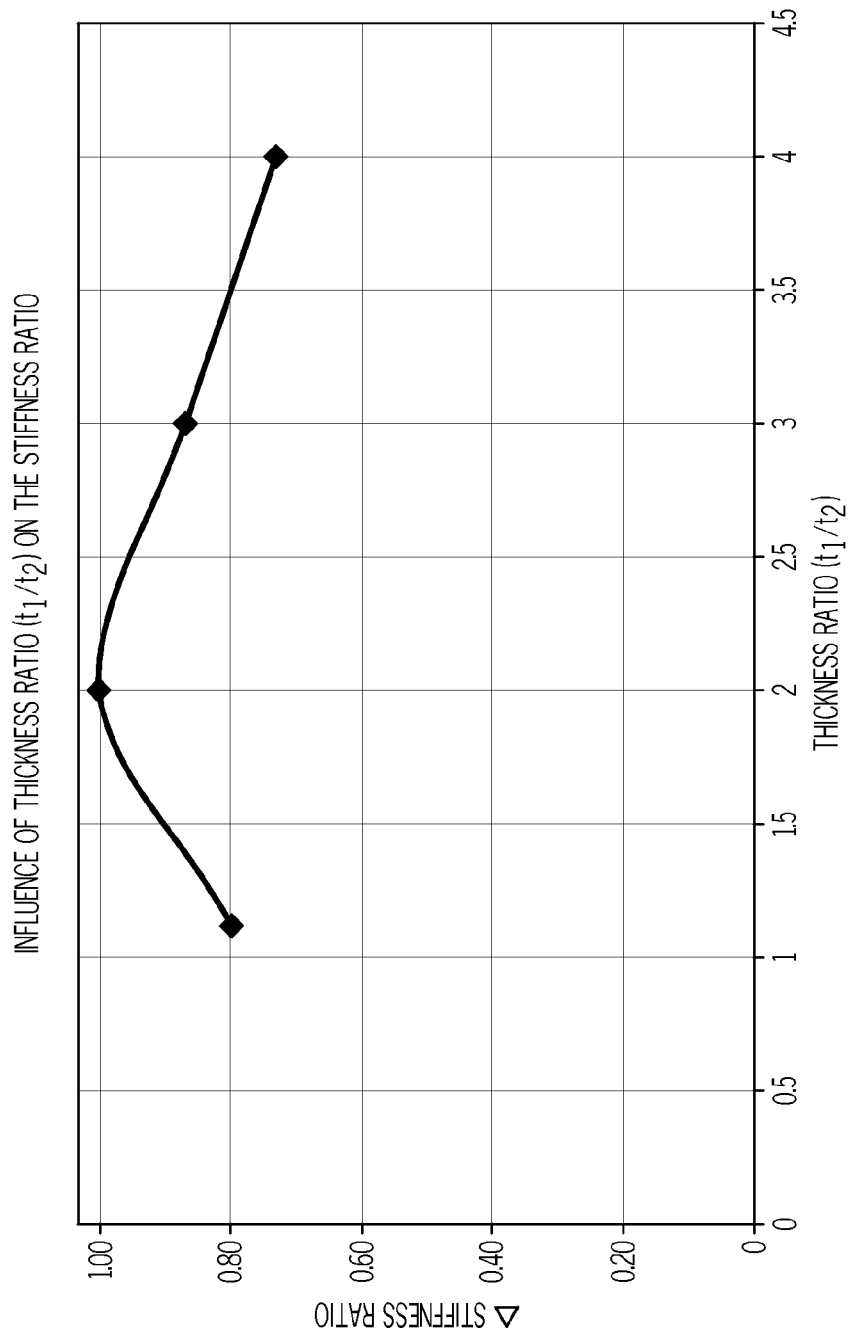
Figure 8:
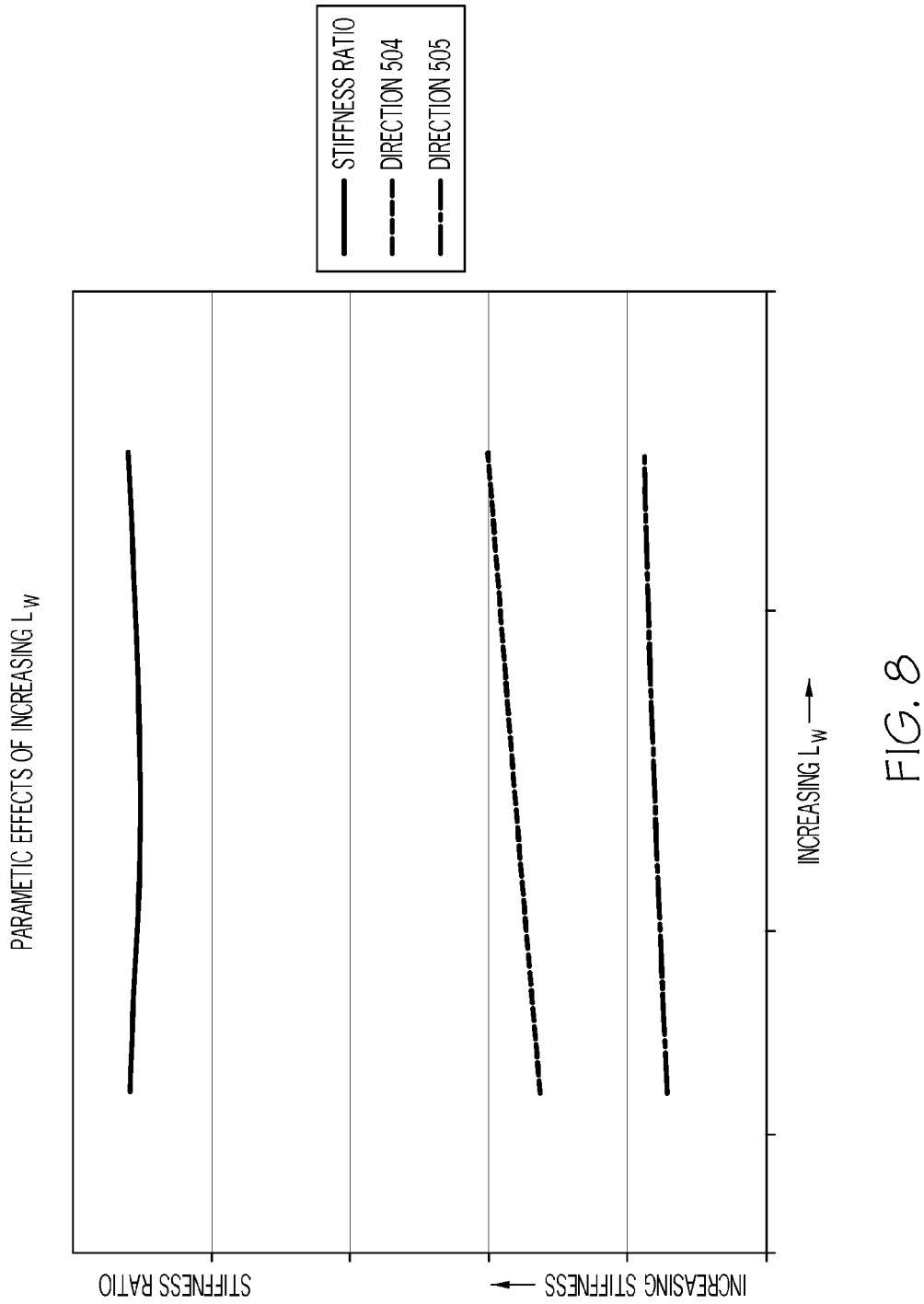

In an exemplary embodiment, FIG. 6 illustrates the influence of the axial rib central angle $\theta_1$ on the stiffness ratio (illustrated as a change ($\Delta$) in the absolute stiffness ratio). As shown in FIG. 6, increasing the angle $\theta_1$ results in a decrease in the stiffness ratio (i.e., the stiffness of the bearing sump 100 decreases in the first direction 504 relative to the second direction 505). In an exemplary embodiment, FIG. 7 illustrates the influence of the thickness ratio ($t_1/t_2$) on the stiffness ratio (illustrated as a change ($\Delta$) in the absolute stiffness ratio). As shown in FIG. 7, as the thickness ratio increases from unity, the stiffness ratio increases until it reaches a maximum value at a thickness ratio of two. Thereafter, as the thickness ratio increases, the stiffness ratio decreases. In an exemplary embodiment, FIG. 8 illustrates the influence of the window (109, 110) length $L_w$ on the stiffness ratio and on the directional stiffnesses (504, 505). As shown in FIG. 8, increasing $L_w$ increases the stiffness in both the first direction 504 and the second direction 505. However, due to the different rates of change thereof, FIG. 8 also illustrates that the stiffness ratio remains relatively constant.

In practice, in order to appropriately select the parametric values of the bearing sump 100 to achieve the most desirable stiffnesses for damping NSV in a given implementation, an assessment of NSV can be performed on the rotating system using rotordynamic analysis. Thereafter, a recommendation for the value of the stiffness ratio, as well as for the value each directional stiffness (504, 505), can be provided. Thereafter, the design is implemented and tested, and tuning refinements are made as needed using an iterative procedure.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended Claims. For example, while the particular embodiments disclosed are presented with regard to a series of ranges for the sizes of certain components (and ratios of sizes of certain components), it will be appreciated that in other embodiments, the bearing sump can be larger or smaller, or in different proportions, as one of ordinary skill in the art will be able to adapt the teachings herein to various sizes of bearings and rotating members.

What is claimed is:

1. A bearing sump, comprising:
    an annular housing having a first axial length that is substantially equivalent to an axial length of the bearing sump;
    an annular bearing support disposed concentrically within the annular housing and having a second axial length that is less than about 50% of the first axial length;
    an annular space between the housing and the bearing support;
    first and second axial ribs in the form of annular segments having a central angle of less than about 60 degrees and connecting with both the housing and the bearing support; and
    an end ring disposed concentrically and abuttingly within the housing and having a third axial length that is less than about 50% of the first axial length, wherein each of the first and second axial ribs form a portion of the end ring.

2. The bearing sump of claim 1, wherein the bearing support is configured to receive an annular bearing for providing vibration damping thereto.

3. The bearing sump of claim 1, wherein the housing, the bearing support, and the first and second axial ribs form an integral structure.

4. The bearing sump of claim 1, wherein a sum of a radial thickness of the housing plus a radial thickness of the end ring is substantially equivalent to a radial thickness of the first and second axial ribs.

5. The bearing sump of claim 1, wherein the end ring is disposed along a first axial end of the bearing support that is adjacent to a constrained aft plane and wherein the bearing support is disposed along a second axial end of the bearing support opposite the first axial end.

6. The bearing sump of claim 5, wherein a sum of the second and third axial lengths is less than the first axial length, and wherein a void is disposed between the end ring and the bearing support.

7. The bearing sump of claim 6, wherein the void and the annular space are connected to one another so as to allow oil to drain from the bearing sump.

8. The bearing sump of claim 1, wherein a sum of a radial thickness of the housing plus a radial thickness of the annular space plus a radial thickness of the bearing support is substantially equivalent to a radial thickness of the first and second axial ribs.

9. The bearing sump of claim 8, wherein the radial thickness of the bearing support divided by the radial thickness of the housing is about 2.

10. The bearing sump of claim 1, wherein an axial length of the first and second axial ribs is substantially equivalent to the first axial length.

11. A bearing sump for damping non-synchronous vibration, comprising:
an annular housing having a first axial length that is substantially equivalent to an axial length of the bearing sump;
an annular bearing support disposed concentrically within the annular housing and having a second axial length that is less than about 50% of the first axial length;
an annular space between the housing and the bearing support;
first and second axial ribs in the form of annular segments having a central angle of less than about 60 degrees and connecting with both the housing and the bearing support;
an end ring disposed concentrically and abuttingly within the housing and having a third axial length that is less than about 50% of the first axial length,
wherein the end ring is disposed along a first axial end of the bearing support that is adjacent to a constrained aft plane and wherein the bearing support is disposed along a second axial end of the bearing support opposite the first axial end,
wherein the sum of the second and third axial lengths is less than the first axial length, and wherein a void is disposed between the end ring and the bearing support,
wherein the bearing support is configured to receive an annular bearing for providing vibration damping thereto,
wherein the housing, the bearing support, and the first and second axial ribs form an integral structure, and
wherein the bearing support has a radial thickness that is greater than or equal to a radial thickness of the housing.

12. A bearing sump, comprising:
an annular housing having a first axial length that is substantially equivalent to an axial length of the bearing sump;
an annular bearing support disposed concentrically within the annular housing and having a second axial length that is less than about 50% of the first axial length;
an annular space between the housing and the bearing support;
first and second axial ribs in the form of annular segments having a central angle of less than about 60 degrees and connecting with both the housing and the bearing support; and
an end ring disposed concentrically and abuttingly within the housing and having a third axial length that is less than about 50% of the first axial length, wherein a sum of a radial thickness of the housing plus a radial thickness of the end ring is substantially equivalent to a radial thickness of the first and second axial ribs.

13. The bearing sump of claim 12, wherein the end ring is disposed along a first axial end of the bearing support that is adjacent to a constrained aft plane and wherein the bearing support is disposed along a second axial end of the bearing support opposite the first axial end.

14. The bearing sump of claim 13, wherein a sum of the second and third axial lengths is less than the first axial length, and wherein a void is disposed between the end ring and the bearing support.

15. The bearing sump of claim 14, wherein the void and the annular space are connected to one another so as to allow oil to drain from the bearing sump.

16. The bearing sump of claim 12, wherein a sum of a radial thickness of the housing plus a radial thickness of the annular space plus a radial thickness of the bearing support is substantially equivalent to a radial thickness of the first and second axial ribs.

17. The bearing sump of claim 16, wherein the radial thickness of the bearing support divided by the radial thickness of the housing is about 2.

18. The bearing sump of claim 12, wherein an axial length of the first and second axial ribs is substantially equivalent to the first axial length.

* * * * *